(12) United States Patent
Hu et al.

(10) Patent No.: US 8,390,946 B2
(45) Date of Patent: Mar. 5, 2013

(54) ELECTROMAGNETIC LENS DRIVING DEVICE

(75) Inventors: Chao Chang Hu, Taoyuan County (TW); Fu Yuan Wu, Taoyuan County (TW); Shih Ting Huang, Taoyuan County (TW)

(73) Assignee: TOK Taiwan Corp. (TW)

( * ) Notice: Subject to any disclaimer, the term of this patent is extended or adjusted under 35 U.S.C. 154(b) by 196 days.

(21) Appl. No.: 12/925,621

(22) Filed: Oct. 25, 2010

(65) Prior Publication Data
US 2012/0026611 A1 Feb. 2, 2012

(30) Foreign Application Priority Data

Jul. 27, 2010 (TW) .............................. 99124625 A (51) Int. Cl.
*G02B 7/02* (2006.01)
*G02B 15/14* (2006.01)

(52) U.S. Cl. ......... 359/824; 359/696; 359/822; 359/823

(58) Field of Classification Search .......... 359/694–700, 359/811–824
See application file for complete search history.

(56) References Cited

U.S. PATENT DOCUMENTS
2007/0127325 A1* 6/2007 Yamashita ................. 369/44.14
* cited by examiner

*Primary Examiner* — Mohammed Hasan (57) ABSTRACT

An electromagnetic lens driving device includes a casing, a lens module, a positioning structure, and an electromagnetic driving module. The lens module is provided in a receiving space defined in the casing. The positioning structure, which is connected between the lens module and the casing, is configured to limit the lens module within the receiving space and generate a frictional force. The electromagnetic driving module is provided in the receiving space and corresponds in position to the lens module. When supplied with electricity, the electromagnetic driving module generates a magnetic force that drives the lens module to move along a central axis. Once the electricity is cut off, the lens module is fixed in position and prevented from moving freely by the frictional force of the positioning structure; hence, the electromagnetic lens driving features economical use of electricity.

8 Claims, 7 Drawing Sheets

A-A section

ELECTROMAGNETIC LENS DRIVING DEVICE

BACKGROUND OF INVENTION

1. Field of the Invention

The present invention relates to a lens driving device and, more particularly, to an electromagnetic lens driving device which includes: an electromagnetic driving module for driving a lens module to move within a casing, and a positioning structure for securing the lens module in position within the casing when power is cut off.

2. Description of the Prior Art

Figure 1:
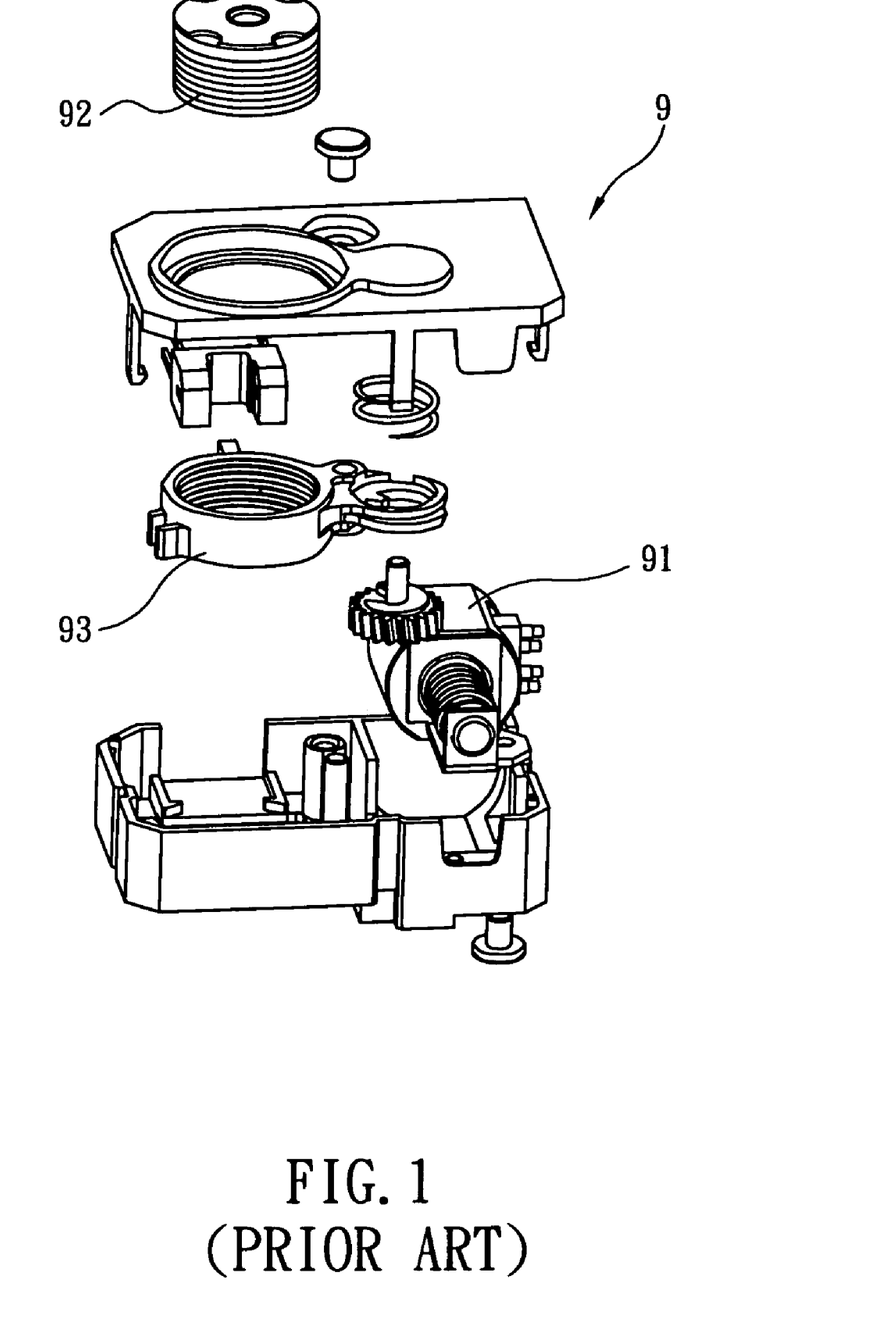
FIG. 1 is an exploded perspective view of a conventional zoom lens.

Please refer to FIG. 1 for an exploded perspective view of a conventional zoom lens. The conventional zoom lens uses a mechanical transmission-type focusing mechanism 9 that includes not only a multitude of transmission elements, but also a high-cost, high-precision driving element 91 (e.g., a stepper motor, ultrasonic motor, piezoelectric actuator, etc.) as a power source for driving a lens mount 93 mounted with a lens set 92. Therefore, the focusing mechanism 9 is disadvantaged by a complex mechanical structure, a complicated assembly process, a large volume, an elevated cost, significant power consumption, and consequently a high selling price.

Moreover, with continuous progress of science and technology, the traditional specialized photographic devices are improving in terms of compactness as well as image quality so as to cope with the various new products in the era of information technology. Nevertheless, the conventional stepper motor-driven zoom lens cannot be further downsized and therefore prevents the overall products from getting thinner and lighter. The electromagnetic technology is a known feasible solution to the problem described above. For instance, a voice coil motor (VCM)-based electronic feedback system can be used to monitor the shift of the coil and replace the conventional stepper motor, with a view to reducing the volume of the driving structure.

On the other hand, it is a trend nowadays to integrate products of different functions. For example, photographic functions are incorporated into mobile phones, personal digital assistants (PDAs), and laptop computers to provide enhanced image capture capabilities.

Therefore, it is a major subject of research and development in the related industry to reduce the volumes, costs, and power consumption of the various components of an integrated product that share the same power supply. It is particularly hoped that, given the same power supply capacity, the standby time and operation time of the product can be effectively increased.

SUMMARY OF INVENTION

The first objective of the present invention is to provide an electromagnetic lens driving device based on the principle of electromagnetic induction, wherein electric current is applied to an annular coil to drive a lens module into linear axial displacement within a receiving space. As the conventional stepper motor is omitted, the number of components is reduced, the lens driving device downsized, and the overall structure simplified.

The second objective of the present invention is to provide an electromagnetic lens driving device which includes a positioning structure for fixing a lens module in position within the receiving space of a casing when power supply to an electromagnetic driving module is cut off. Thus, the electromagnetic lens driving device advantageously saves electricity.

In order to achieve the above mentioned objective, the present invention discloses an electromagnetic lens driving device which comprises:

a casing forming a receiving space;

a lens module received in the receiving space;

an electromagnetic driving module provided in the receiving space and connected between the lens module and the casing, the electromagnetic driving module comprising a plurality of magnets and a coil, wherein when currents of different directions flow through the coil, the coil generates magnetic fields of different polarities that cause magnetic attraction or repulsion between the plural magnets and the coil, thereby driving the lens module to move in the receiving space along a central axis; and a positioning structure connected between the lens module and the casing, the positioning structure being configured to limit the lens module within the receiving space and generate a frictional force, wherein when the currents flowing through the coil cease, the lens module is fixed in position by the frictional force of the positioning structure and is therefore prevented from moving freely.

In a preferred embodiment, the lens module comprises a lens and a lens mount, the lens being provided in the lens mount and synchronously movable with the lens mount.

In a preferred embodiment, the electromagnetic lens driving device further comprises a sensing module for detecting relative positions of the casing and the lens module, wherein the sensing module is one of an optical sensing module and a magnetic sensing module.

In a preferred embodiment, the coil is connected to an outer periphery of the lens module, and the plural magnets are provided on the casing and correspond in position to the coil, the plural magnets being evenly arranged along and embedded in a periphery of the receiving space in the casing.

In a preferred embodiment, the electromagnetic lens driving device further comprises an upper cover connected to the casing, and the positioning structure comprises a first guide shaft and a resilient pre-stressed element, the first guide shaft having two ends respectively and fixedly connected to the upper cover and the casing such that the first guide shaft is connected therebetween, the pre-stressed element having a pivot end pivotally mounted around the first guide shaft with such tightness that the frictional force is generated at a contact surface between the pivot end and the first guide shaft.

In a preferred embodiment, the pre-stressed element is a curved U-shaped claw having two hook members extending from the pivot end, the two hook members being engaged with a fixing end protruding from an outer periphery of the lens mount, the two hook members of the pre-stressed element being spaced apart by a predetermined distance greater than or equal to a width of the coil, the two hook members having front ends whose inner sides are provided with corresponding recesses respectively, the recesses being configured to engage respectively with two sides of the fixing end protruding from the outer periphery of the lens mount.

In a preferred embodiment, the lens mount has an outer periphery provided with a first sliding block, the first sliding block having a guide hole by which the first sliding block is pivotally mounted around the first guide shaft so as to be displaced axially.

In a preferred embodiment, the positioning structure further comprises a second guide shaft, the second guide shaft having two ends respectively and fixedly connected to the upper cover and the casing such that the second guide shaft is connected therebetween, and wherein the outer periphery of the lens mount is provided with a second sliding block at a position opposite the first sliding block, the second sliding block having a U-shaped slot for pressing against the second guide shaft and thereby enabling synchronous axial displacement of the first sliding block and the second sliding block.

In a preferred embodiment, the electromagnetic lens driving device further comprises a shell and a circuit board, the circuit board being embedded in the casing and electrically connected to the coil and the sensing module, the shell being mounted around the casing and the upper cover and covering the circuit board.

In a preferred embodiment, the sensing module is an optical sensing module and comprises a reflective mirror, a reflective mirror seat, and a position sensor, the reflective mirror being fixedly connected to the reflective mirror seat, the reflective mirror seat being provided at a predetermined position on an outer periphery of the lens mount and corresponding in position to the position sensor, which is provided on the casing.

BRIEF DESCRIPTION OF THE DRAWINGS

The invention as well as a preferred mode of use, further objects, and advantages thereof will be best understood by referring to the following detailed description of an illustrative embodiment in conjunction with the accompanying drawings, in which.

DETAILED DESCRIPTION OF THE PREFERRED EMBODIMENT

Referring to FIG. 2, FIG. 3, FIG. 4A, and FIG. 4B, an electromagnetic lens driving device 1 defines a central axis 5 and includes an upper cover 11, a casing 12, a lens module 13, a positioning structure 14, an electromagnetic driving module 15, a sensing module 16, a circuit board 17, and a shell 18. The central axis 5 has two axial directions, namely a front direction 51 and a rear direction 52.

The upper cover 11 is a hollow annular cover, and the casing 12 is a hollow seat. When connected to each other, the upper cover 11 and the casing 12 substantially form a hollow housing structure that defines a receiving space 122 therein. The receiving space 122 thus defined in the casing 12 has a periphery provided with a plurality of evenly arranged receiving slots 1221.

The lens module 13 is located in the receiving space 122 and centered on the central axis 5. When driven by the electromagnetic driving module 15, the lens module 13 is moved upward or downward along the central axis 5 (i.e., in the front direction 51 or the rear direction 52) within the receiving space 122 jointly formed by the upper cover 11 and the casing 12. The lens module 13 includes a lens 131 and a lens mount 132, wherein the lens 131 is provided at the center of the lens mount 132 and can be moved synchronously with the lens mount 132.

The electromagnetic driving module 15 is disposed in the receiving space 122 and corresponds in position to the lens module 13. The electromagnetic driving module 15 includes a coil 151 and a plurality of magnets 152. The coil 151 is an annular coil connected to (e.g., wound around) the outer periphery of the lens module 13 and corresponds in position to the plural magnets 152 provided on the casing 12.

The magnets 152 are located in the receiving space 122 and correspond in position to the coil 151. When currents of different directions flow through the coil 151, the coil 151 produces different magnetic lines that result in magnetic attraction or repulsion between the plural magnets 152 and the coil 151, thereby driving the lens module 13 to move along the central axis 5 within the receiving space 122. Once the current supply is switched off, the lens module 13 is fixed in position in the receiving space 122 and kept centered on the central axis 5 by the positioning structure 14, as explained further below. In a preferred embodiment of the present invention, the magnets 152 are a plurality of (e.g. four) permanent magnets evenly arranged along and embedded in the periphery of the receiving space 122 of the casing 12. More specifically, the magnets 152 are received in the receiving slots 1221 respectively. Thus, in response to the electromagnetic force generated by the coil 151 when electrified, the magnets 152 are attracted to or repelled by the coil 151.

The sensing module 16 is configured to detect the relative positions of the casing 12 and the lens module 13. The sensing module 16 can be an optical sensing module or a magnetic sensing module. In a preferred embodiment of the present invention, the sensing module 16 is an optical sensing module and includes a reflective mirror 161, a reflective mirror seat 162, and a position sensor 163. The reflective mirror 161 is fixedly connected to the reflective mirror seat 162. The reflective mirror seat 162 is provided at a predetermined position on the outer periphery of the lens mount 132 and corresponds in position to the position sensor 163, which is provided on the casing 12. The position sensor 163 is configured to detect the displacement of the lens mount 132 in the receiving space 122, i.e., displacement along the central axis 5, so that the focal length or zoom length of the lens 131 can be adjusted accordingly. In an embodiment not shown in the drawings, the sensing module 16 is a magnetic sensing module. In that case, the reflective mirror 161 is replaced by a permanent magnet, and the position sensor 163 by a sensor for sensing the magnetic intensity of the permanent magnet and converting the magnetic intensity into displacement.

The circuit board 17 is embedded in the casing 12, located above the position sensor 163, and electrically connected to the coil 151 and the sensing module 16. The shell 18 is a hollow case mounted around the casing 12 and the upper cover 11 and covers the circuit board 17 so as to block external electromagnetic interference. The shell 18 has a lower opening provided with a plurality of fixing feet 181 for connecting with electronic products configured for other applications.

Figure 4A:
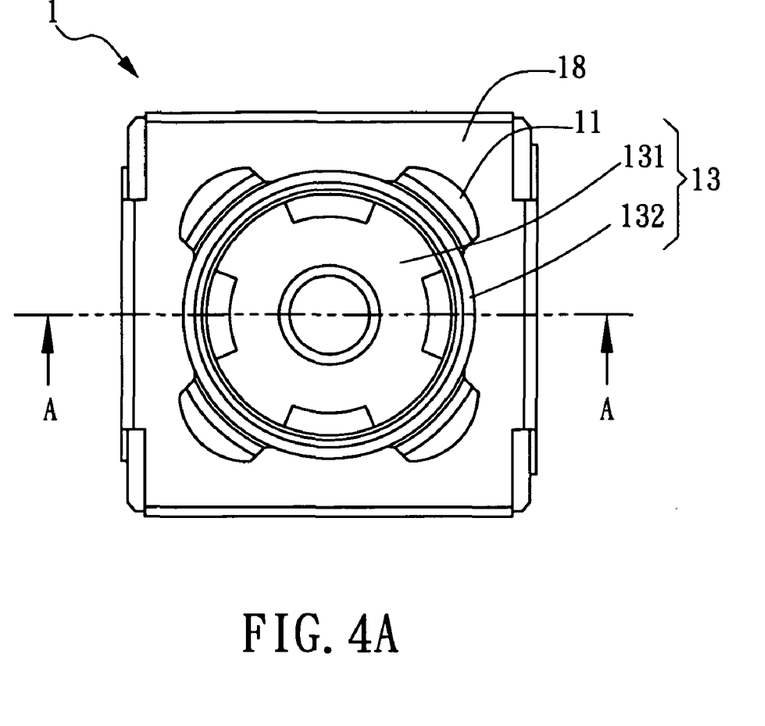
FIG. 4A is a top view of the electromagnetic lens driving device according to the present invention.
Figure 4B:
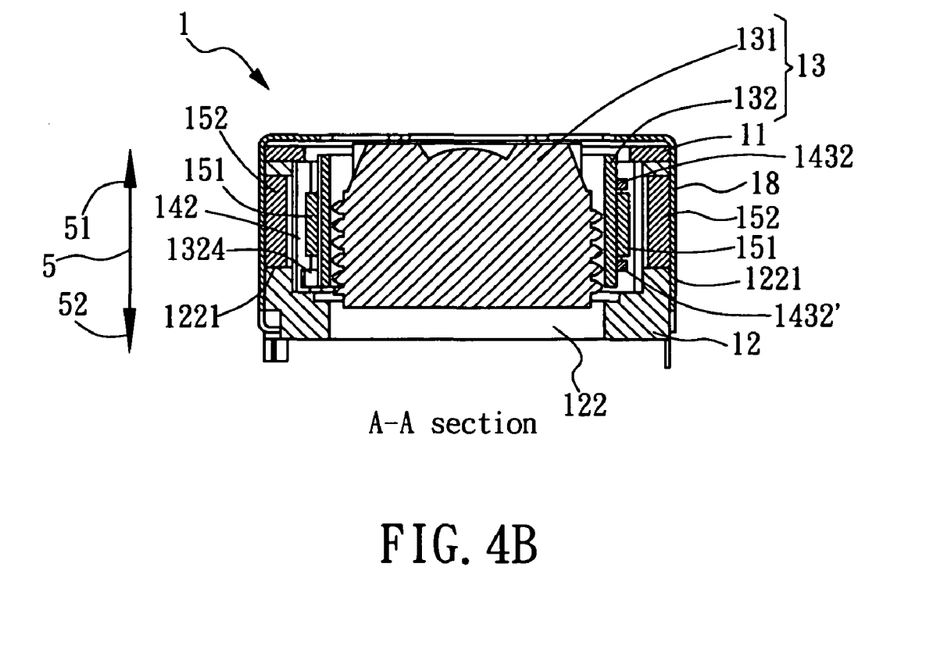
FIG. 4B is a sectional view taken along line A-A of FIG. 4A.
Figure 5:
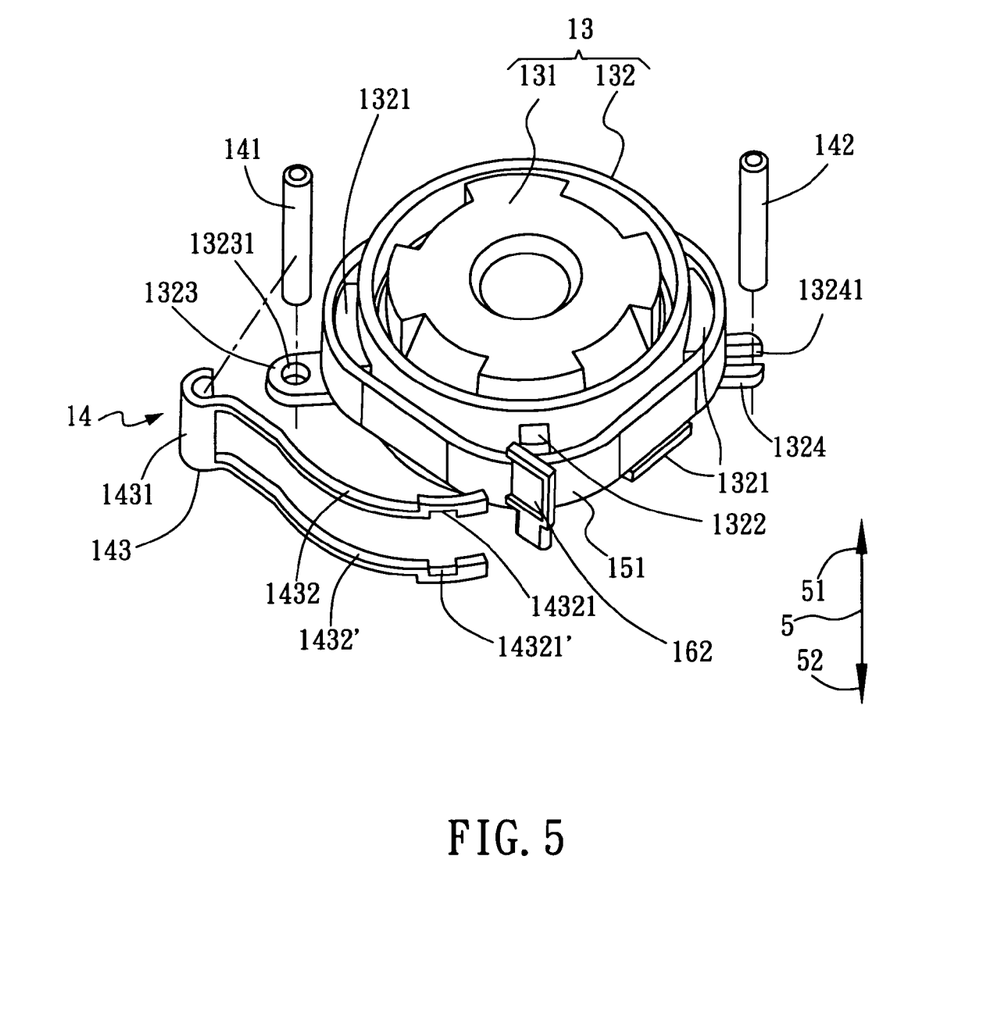
FIG. 5 is a perspective view showing the arrangement of a lens module, a coil, and a positioning structure of the electromagnetic lens driving device according to the present invention.

Referring to FIG. 5 in conjunction with FIG. 4B, the coil 151 is provided in the gap between the lens mount 132 and the casing 12. In addition, the coil 151 is fixed in position to the periphery of the lens mount 132 by a plurality of fixing blocks 1321 protruding from the periphery of the lens mount 132. When predetermined currents of different directions are applied to the coil 151, the change of the current-induced magnetic fields causes the lens mount 132 to move in the receiving space 122 along one of the two different axial directions (i.e., the front direction 51 or the rear direction 52) of the central axis 5, thereby focusing or zooming the lens 131.

Figure 2:
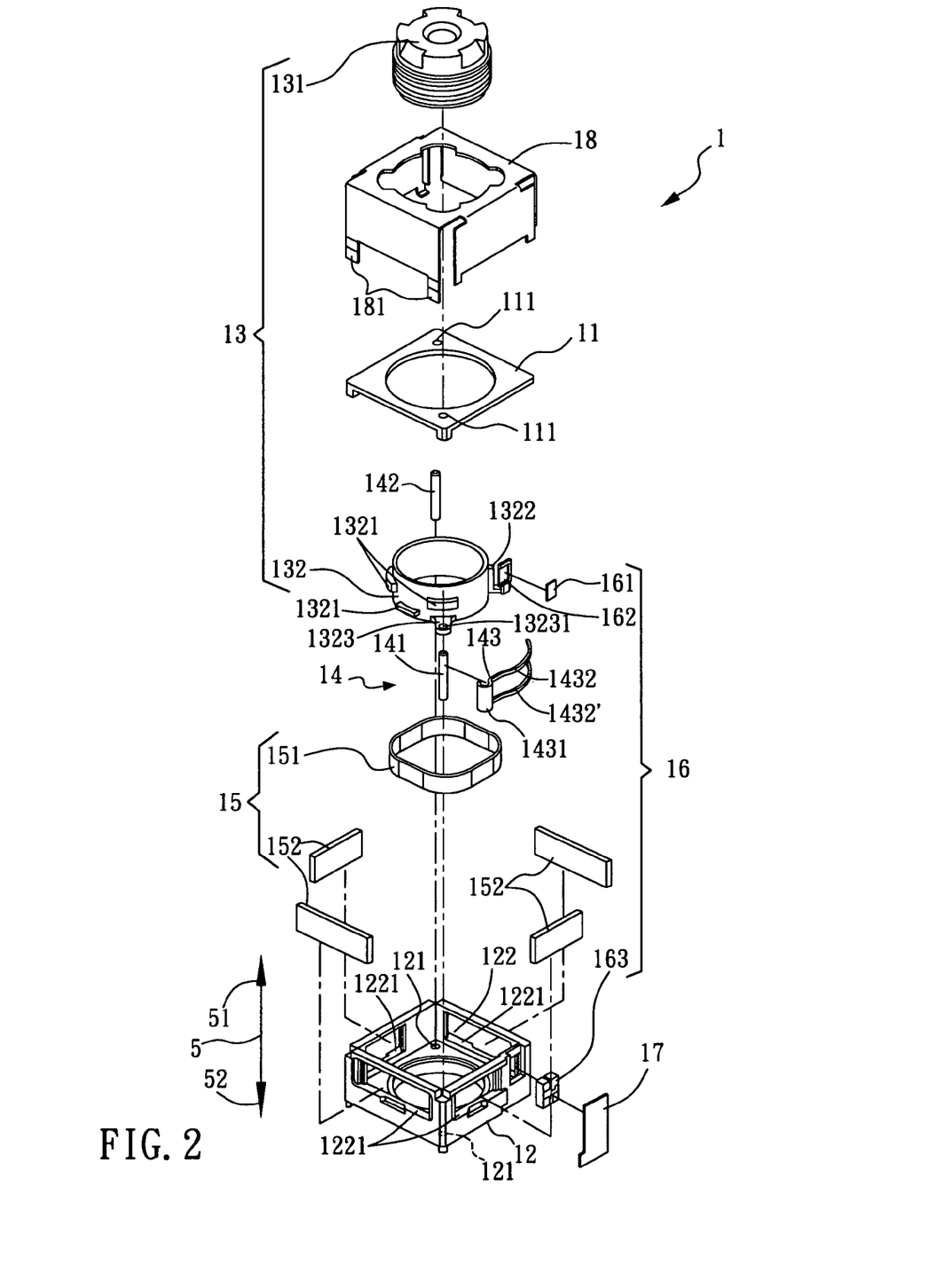
FIG. 2 is an exploded perspective view of an electromagnetic lens driving device according to the present invention.
Figure 3:
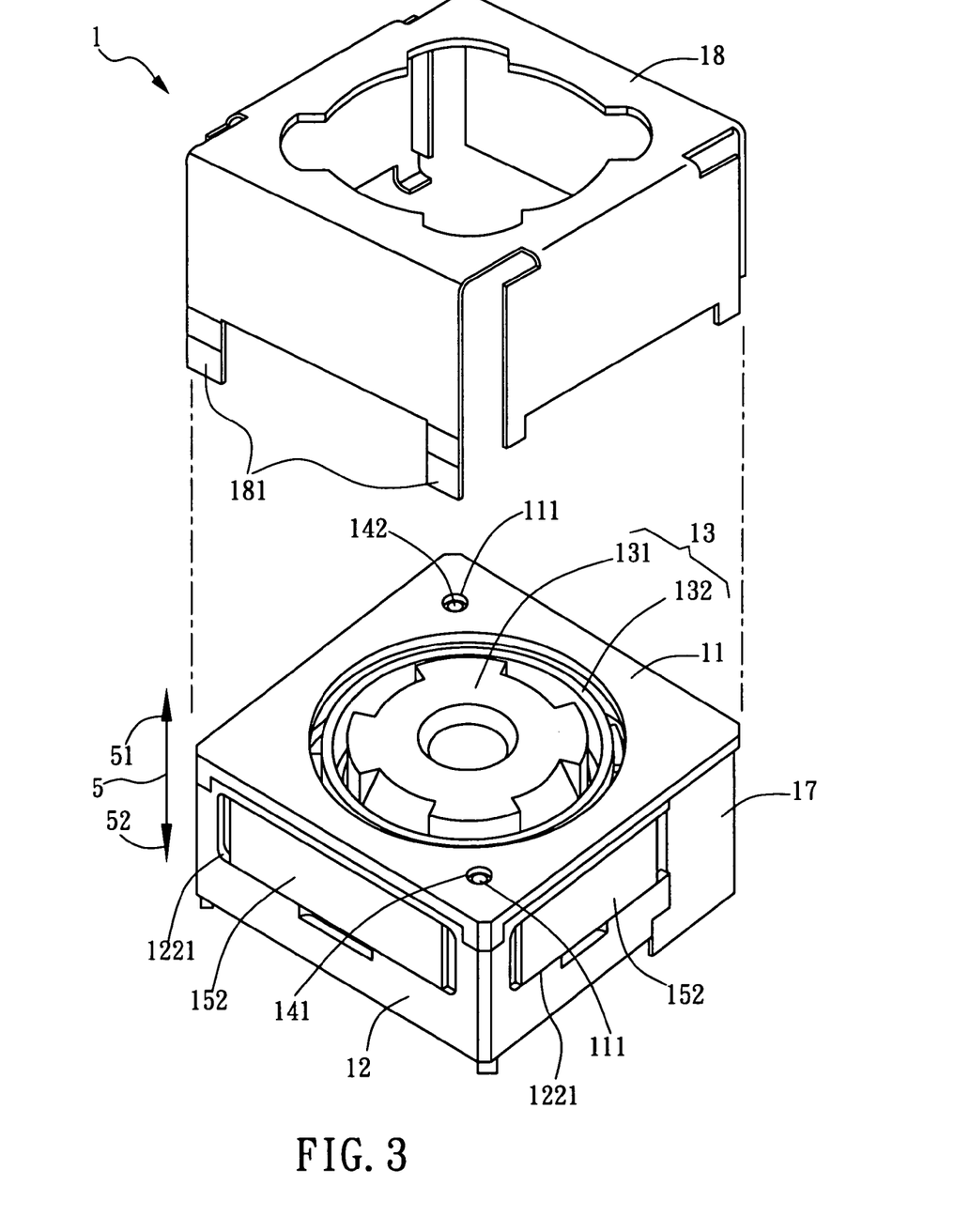
FIG. 3 is an assembled perspective view of the electromagnetic lens driving device according to the present invention.
Figure 6:
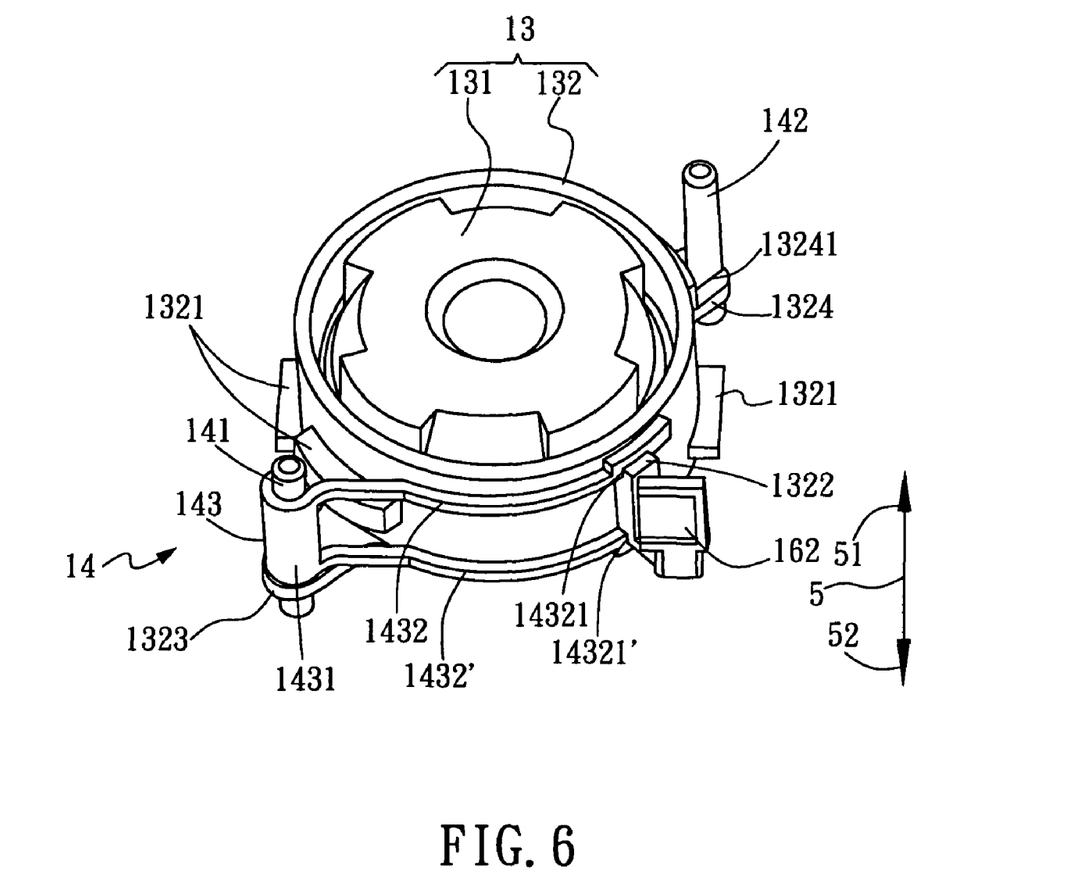
FIG. 6 is an assembled perspective view of the lens module and the positioning structure shown in FIG. 5.
Figure 7:
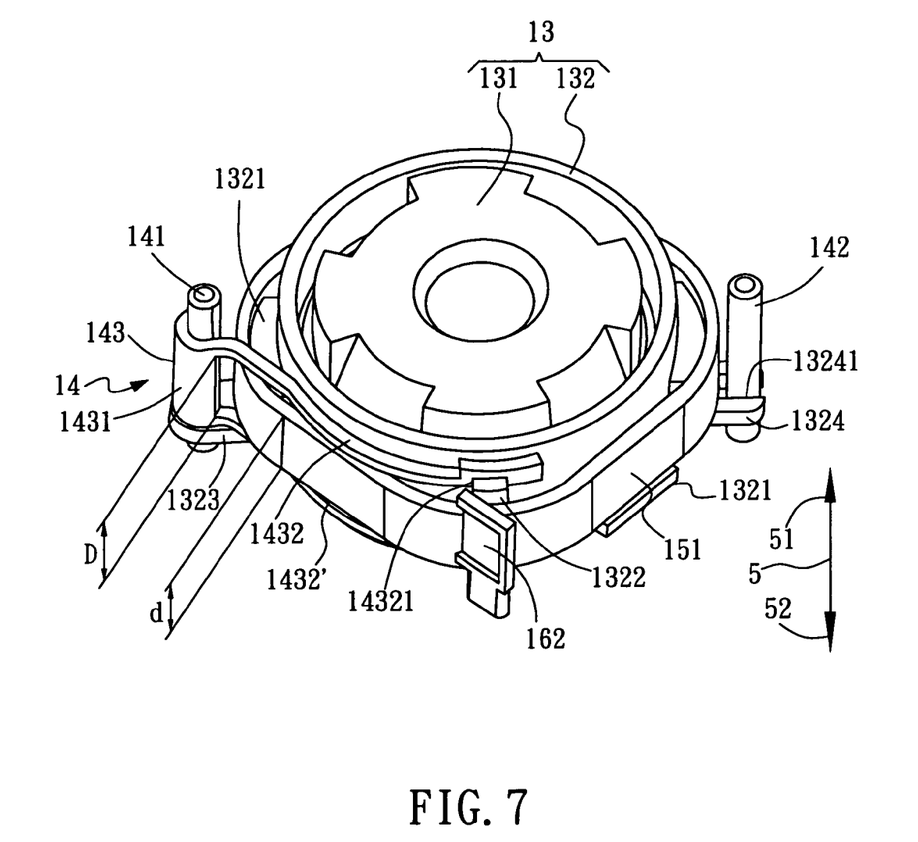
FIG. 7 is an assembled perspective view of the lens module, the coil, and the positioning structure shown in FIG. 5.

Referring to FIG. 6 and FIG. 7 in conjunction with FIG. 2 and FIG. 5, the positioning structure 14 is provided between the upper cover 11 and the casing 12, disposed in the receiving space 122, and located on one lateral side of the lens mount 132, so as to limit the lens mount 132 of the lens module 13 within the receiving space 122. The positioning structure 14 includes a first guide shaft 141, a second guide shaft 142, and at least one resilient pre-stressed element 143. Each of the first guide shaft 141 and the second guide shaft 142 has two ends respectively and fixedly connected to a connecting point 111 of the upper cover 11 and a fixing point 121 of the casing 12 such that the first guide shaft 141 and the second guide shaft 142 are connected between the upper cover 11 and the casing 12, are situated on two opposite lateral sides of the lens module 13 respectively, and are substantially parallel to the central axis 5. Thus, the first guide shaft 141 and the second guide shaft 142 serve as guide rails for guiding the lens module 13 in the receiving space 122 and allowing the lens module 13 to move linearly in the front direction 51 or the rear direction 52 of the central axis 5.

The outer periphery of the lens mount 132 is provided with a first sliding block 1323 and a second sliding block 1324. The first sliding block 1323 and the second sliding block 1324 are symmetrically disposed and are respectively and pivotally connected to the first guide shaft 141 and the second guide shaft 142. The first sliding block 1323 is formed with a guide hole 13231 by which the first sliding block 1323 is slidably mounted around the first guide shaft 141 so as to be displaced axially. The second sliding block 1324 is formed with a U-shaped slot 13241 for pressing against the second guide shaft 142 and hence enabling synchronous axial displacement of the first sliding block 1323 and the second sliding block 1324. In other words, the first and second sliding blocks 1323, 1324 are configured to enable linear axial displacement of the lens module 13 along the first and second guide shafts 141, 142.

The pre-stressed element 143 is a curved U-shaped claw. The pre-stressed element 143 has a bottom portion formed as a pivot end 1431 which is pivotally mounted around the first guide shaft 141. The two extensions of the pre-stressed element 143, namely the two hook members 1432, 1432', are engaged with a fixing end 1322 protruding from the outer periphery of the lens mount 132. More particularly, the pivot end 1431 of the pre-stressed element 143 is pivotally mounted around the first guide shaft 141 with such tightness that a predetermined frictional force is generated at the contact surface between the pivot end 1431 and the first guide shaft 141. When the pushing or pulling force generated by the electromagnetic driving module 15 due to the currents flowing in the coil 151 is greater than the predetermined frictional force, the lens mount 132 is driven to move, together with the lens 131 mounted therein and the pre-stressed element 143, by the electromagnetic driving module 15. However, when the currents supplied to the coil 151 are cut off, the lens mount 132 and the lens 131 mounted therein are fixed in position by the predetermined frictional force between the pivot end 1431 and the first guide shaft 141 and are therefore prevented from sliding freely. As the lens mount 132 and the lens 131 can be fixed in place with the current supply cut off, the electromagnetic lens driving device 1 of the present invention features economical use of electricity. Besides, in the present embodiment, the two hook members 1432, 1432' of the pre-stressed element 143 are spaced apart by a predetermined distance D, wherein the predetermined distance D is greater than or equal to the width d of the coil 151 (i.e., D≧d). In addition, two corresponding recesses 14321, 14321' are formed on the inner sides of the front ends of the two hook members 1432, 1432' respectively. The two recesses 14321, 14321' are configured to engage respectively with two sides of the fixing end 1322 protruding from the outer periphery of the lens mount 132.

More specifically, once the pivot end 1431 of the pre-stressed element 143 is connected to the first guide shaft 141, the distance D between the two hook members 1432, 1432' of the pre-stressed element 143 spans across the width d of the coil 151. Meanwhile, the recesses 14321, 14321' on the inner sides of the front ends of the two hook members 1432, 1432' are engaged respectively with the two sides of the fixing end 1322 protruding from the outer periphery of the lens mount 132. Therefore, by virtue of the fixing end 1322 on the outer periphery of the lens mount 132, the axial displacement of the lens module 13 caused by the magnetic interaction between the coil 151 and the magnets 152 drives the two hook members 1432, 1432' of the pre-stressed element 143 to move synchronously with the lens module 13. As a result, the pivot end 1431 of the pre-stressed element 143 and the first sliding block 1323 on the outer periphery of the lens mount 132 are moved axially along the first guide shaft 141.

In other words, by applying an input current to the coil 151 of the electromagnetic driving module 15 through the circuit board 17 and changing the direction of the input current, magnetic attraction or repulsion takes place between the magnets 152 and the magnetic field generated by the coil 151. Then, by means of the first and second sliding blocks 1323, 1324 separately provided on the outer periphery of the lens mount 132, the lens module 13 is moved in the receiving space 122 along the first and second guide shafts 141, 142 in the front direction 51 or the rear direction 52 of the central axis 5. When the input current applied to the coil 151 ceases, the coil 151 produces no magnetic field that can interact magnetically with the magnets 152, and the lens module 13 is held at a fixed position along the first and second guide shafts 141, 142 by the pre-stressed element 143, or more specifically by the predetermined frictional force between the pivot end 1431 and the first guide shaft 141. Hence, even when power is cut off, the lens module 13 is limited and retained at a fixed position within the receiving space 122 and prevented from moving back and forth therein. Now that the lens module 13 can be fixed in place with the power cut off, the use of electricity can be reduced.

According to the above description, the frictional force required for fixing the lens module 13 in position in the receiving space 122 comes chiefly from the frictional resistance generated by contact between the pivot end 1431 of the pre-stressed element 143 and the first guide shaft 141. The first and second sliding blocks 1323, 1324 oppositely provided on the outer periphery of the lens mount 132 and the first and second guide shafts 141, 142 are provided mainly to ensure that the lens module 13 is displaced axially in the receiving space 122 along the front direction 51 or the rear direction 52 of the central axis 5, thereby increasing the stability of movement of the lens module 13 in the receiving space 122. Besides, the friction between the guide hole 13231 of the first sliding block 1323 and the first guide shaft 141 and the friction between the U-shaped slot 13241 of the second sliding block 1324 and the second guide shaft 142 are very small and hence have little influence on the displacement of the lens module 13 in the receiving space 122.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electromagnetic lens driving device, defining a central axis and comprising:

a casing forming a receiving space;

an upper cover connected to the casing;

a lens module received in the receiving space and further having a lens and a lens mount, the lens being provided in the lens mount and synchronously movable with the lens mount;

an electromagnetic driving module provided in the receiving space and connected between the lens module and the casing, the electromagnetic driving module comprising a plurality of magnets and a coil, wherein when currents of different directions flow through the coil, the coil generates magnetic fields of different polarities that cause magnetic attraction or repulsion between the plural magnets and the coil, thereby driving the lens module to move in the receiving space along the central axis; and a positioning structure connected between the lens module and the casing, the positioning structure being configured to limit the lens module within the receiving space and generate a frictional force, wherein when the currents flowing through the coil cease, the lens module is fixed in position by the frictional force of the positioning structure and is therefore prevented from moving freely; the positioning structure further including:

a first guide shaft, extending parallel to the central axis and having two ends respectively and fixedly connected to the upper cover and the casing such that the first guide shaft is connected therebetween, and a resilient pre-stressed element, formed as a curved U-shaped claw having two hook members extending from a pivot end pivotally mounted around the first guide shaft with such tightness that the frictional force is generated at a contact surface between the pivot end and the first guide shaft, the two hook members spaced apart by a predetermined distance and being engaged individually with a fixing end protruding from an outer periphery of the lens mount, the predetermined distance being greater than or equal to a width of the coil.

2. The electromagnetic lens driving device of claim 1, further comprising a sensing module for detecting relative positions of the casing and the lens module, wherein the sensing module is one of an optical sensing module and a magnetic sensing module.

3. The electromagnetic lens driving device of claim 2, further comprising a shell and a circuit board, the circuit board being embedded in the casing and electrically connected to the coil and the sensing module, the shell being mounted around the casing and the upper cover and covering the circuit board.

4. The electromagnetic lens driving device of claim 1, wherein the coil is connected to an outer periphery of the lens module, and the plural magnets are provided on the casing and correspond in position to the coil, the plural magnets being evenly arranged along and embedded in a periphery of the receiving space in the casing.

5. The electromagnetic lens driving device of claim 2, wherein the sensing module is an optical sensing module and comprises a reflective mirror, a reflective mirror seat, and a position sensor, the reflective mirror being fixedly connected to the reflective mirror seat, the reflective mirror seat being provided at a predetermined position on an outer periphery of the lens mount and corresponding in position to the position sensor, which is provided on the casing.

6. The electromagnetic lens driving device of claim 1, wherein the two hook members further have respective front ends whose inner sides are provided with corresponding recesses respectively, the recesses being configured to engage respectively with two sides of the fixing end protruding from the outer periphery of the lens mount.

7. The electromagnetic lens driving device of claim 1, wherein the lens mount has an outer periphery provided with a first sliding block, the first sliding block having a guide hole by which the first sliding block is pivotally mounted around the first guide shaft so as to be displaced axially.

8. The electromagnetic lens driving device of claim 7, wherein the positioning structure further comprises a second guide shaft, the second guide shaft having two ends respectively and fixedly connected to the upper cover and the casing such that the second guide shaft is connected therebetween, and wherein the outer periphery of the lens mount is provided with a second sliding block at a position opposite the first sliding block, the second sliding block having a U-shaped slot for pressing against the second guide shaft and thereby enabling synchronous axial displacement of the first sliding block and the second sliding block.

* * * * *